(12) United States Patent
Stefanoni

(10) Patent No.: US 8,807,019 B2
(45) Date of Patent: Aug. 19, 2014

(54) GRANULAR INFUSION CARTRIDGE LOADING AND EJECTING DEVICE AND RELATED BEVERAGE DISPENSING MACHINE

(75) Inventor: Roberto Stefanoni, Oggiono (IT)

(73) Assignee: Luigi Lavazza S.p.A., Torino (IT)

( * ) Notice: Subject to any disclaimer, the term of this patent is extended or adjusted under 35 U.S.C. 154(b) by 913 days.

(21) Appl. No.: 12/864,596

(22) PCT Filed: Feb. 5, 2008

(86) PCT No.: PCT/IT2008/000070
§ 371 (c)(1),
(2), (4) Date: Oct. 29, 2010

(87) PCT Pub. No.: WO2009/098720
PCT Pub. Date: Aug. 13, 2009

(65) Prior Publication Data
US 2011/0048242 A1    Mar. 3, 2011

(51) Int. Cl.
*A47J 31/06*    (2006.01)

(52) U.S. Cl.
USPC .......................................... 99/295; 99/289 R

(58) Field of Classification Search
USPC ............................. 99/289 R, 295, 296, 302 R
See application file for complete search history.

(56) References Cited

U.S. PATENT DOCUMENTS 5,755,149 A    5/1998    Blanc et al.
2002/0148356 A1    10/2002    Lazaris et al.

FOREIGN PATENT DOCUMENTS

| FR | 2886121 A1 | 12/2006 |
|----|------------|---------|
| WO | 95/17121 A1 | 6/1995 |
| WO | 2006/126230 A1 | 11/2006 |

*Primary Examiner* — Dana Ross
*Assistant Examiner* — Lindsey C Teaters
(74) *Attorney, Agent, or Firm* — Sughrue Mion, PLLC

(57) ABSTRACT

A device (1) for loading and ejecting pods/cartridges (C) and the like containing a substantially granular preparation for use in machines for infusions such as coffee and the like. The device includes: a support (2); a housing (3) for a cartridge (C), rotatably connected to the support (2); an element (4) for extracting the infusion, connected to the housing (3); a device (5, 6) for locking and supporting the housing (3); an ejector (31) apt to eject the cartridge (C) from the housing (3); and an element (21) for actuating the ejector (31).

12 Claims, 5 Drawing Sheets

GRANULAR INFUSION CARTRIDGE LOADING AND EJECTING DEVICE AND RELATED BEVERAGE DISPENSING MACHINE

CROSS REFERENCE TO RELATED APPLICATIONS

This application is a National Stage of International Application No. PCT/IT2008/000070 filed Feb. 5, 2008, the content of which is incorporated herein by reference in its entirety.

The present invention refers to a device for loading and ejecting cartridges containing a substantially granular preparation for infusions and the like, and a related machine. Several types of machines are known on the market for preparing infusions such as coffee, tea, etc. from a generally granular preparation contained in cartridges, pods or the like.

Such machines typically comprise a boiler where a fluid, generally water, is heated and brought to pressure, and a pod holder that can be fitted to the boiler for extracting the infusion.

In particular, infusion machines envisage a user's placing a new pod in the pod holder and connecting the latter to the boiler. Then, boiler-dispensed fluid under pressure passes through the pod and the infusion made (brewed) is extracted from the bottom of the pod holder. At the end of the infusion extracting step the used pod has to be removed, so as to allow a new use of the machine.

In many infusion machines, pod removal occurs manually, upon disconnecting the pod holder from the boiler. In these cases there is the drawback that the user, by grabbing the pod holder still hot with the fluid-soaked pod, can get burned and/or soil the surrounding environment.

Other machines envisage systems that can be used only in the presence of preparations enclosed in cartridges having a rigid casing, allowing removal of the used cartridge following insertion of a new cartridge. In these cases, the new cartridge pushes the used cartridge toward the mouth of a collection bucket. This ejecting system, besides having the drawback of being specific for a certain type of cartridges, allows no removal of the latter until a new use. Therefore, the fluid-soaked pod continues to release infusion even after the dispensing step, with conceivable hygienic and maintenance problems.

Lastly, other machines utilize gravity pod-ejecting systems. Such systems generally entail the drawback that when the pod holder is less than totally clean the pod is not removed. These ejecting systems are also unsuitable for those pods exhibiting specific adherence to the pod holder surface, like, e.g., pods having a deformable casing (for instance, of paper).

The technical problem underlying the present invention is to provide a device for loading and ejecting pods, cartridges and the like allowing to overcome the drawbacks mentioned above with reference to the known art.

Such a problem is solved by a cartridge loading and ejecting device according to claim 1.

According to the same inventive concept, the present invention further refers to an infusion machine according to claim 24.

Preferred features of the present invention are set forth in the dependent claims thereof.

Hereinafter, the terms cartridge or pod will be used without distinction in order to denote any type of infusion "single-dose" whose casing is manufactured from any one material, such as, e.g., paper, plastics or aluminum.

The present invention provides several relevant advantages. The main advantage of the present invention is to provide a pod loading and ejecting device that may be used with cartridges of a different type, like e.g.: Pods, ESE, Pads, PP cartridges, self-preserving AL cartridges, self-preserving thermoformed material cartridges, etc.

A further advantage of the present invention is to provide an effective and safe ejecting device, allowing the user to eject the pod without coming into contact with the pod holder.

Other advantages, features and the operation steps of the present invention will be made apparent in the following detailed description of some embodiments thereof, given by way of example and not for limitative purposes. Reference will be made to the figures of the annexed drawings, wherein:

FIG. 1 shows a cross-sectional view of an embodiment of a cartridge loading and ejecting device according to the present invention;

FIGS. 2, 3 and 4 each show a top perspective view of an infusion machine comprising the cartridge loading and ejecting device of FIG. 1, in the cartridge loading, infusion machine operation and infusion extracting steps, respectively;

Figure 1:
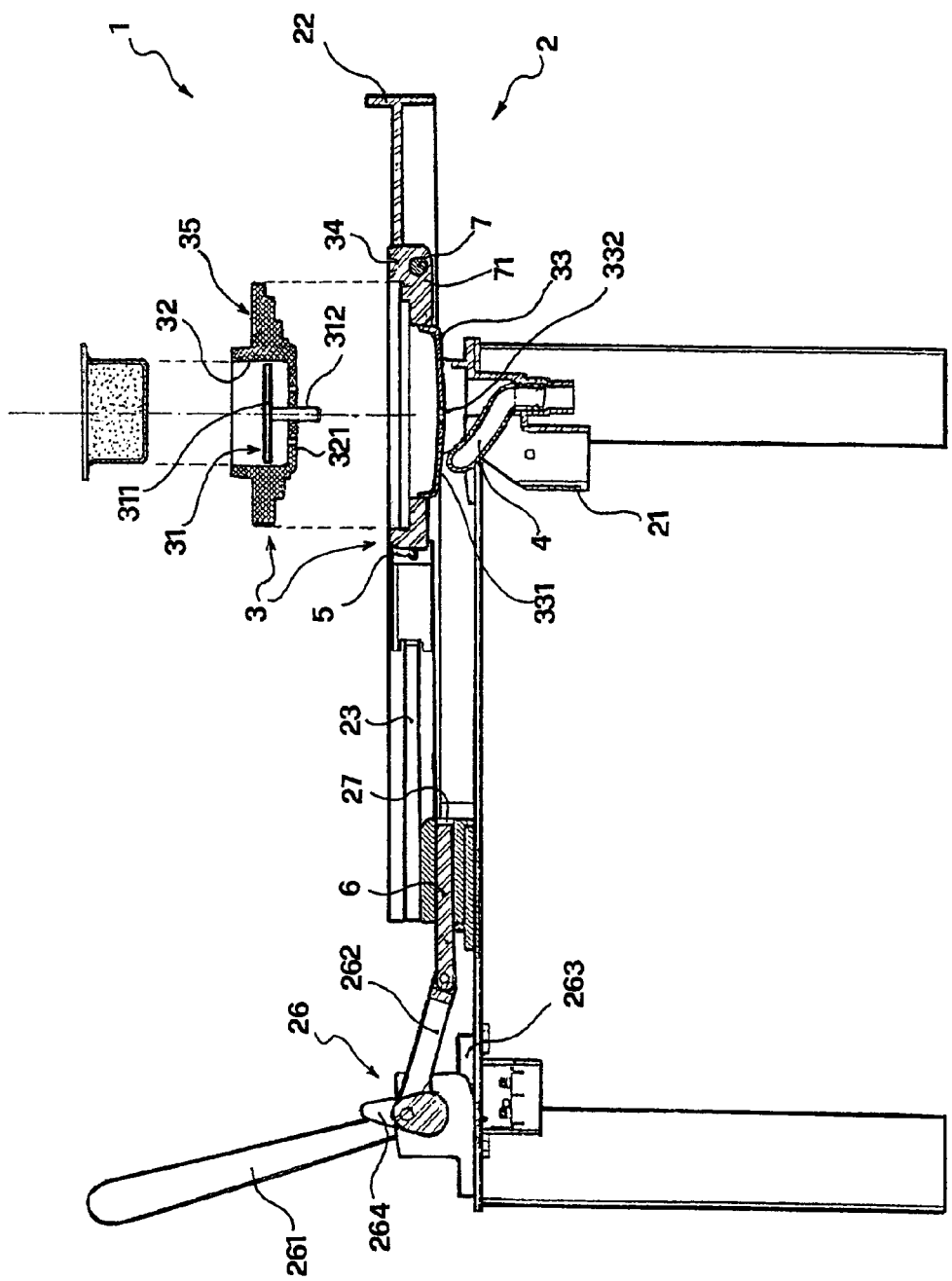

Referring initially to FIG. 1, a cartridge C loading and ejecting device for use in infusion machines is generally denoted by 1.

The device 1 mainly comprises: a support 2, in turn comprising, as it will be detailed hereinafter, a stationary frame and a slidable slide 22, said support 2 to be associated with the frame of a machine for dispensing beverages from a cartridge infusion; a housing 3 for a cartridge C, mounted or mountable onto the support 2; a tubular element 4 for conveying the dispensed beverage into a container such as a small cup or the like; and twin means for locking 5 and supporting 6 the housing 3, associated with the support 2.

Figure 7:
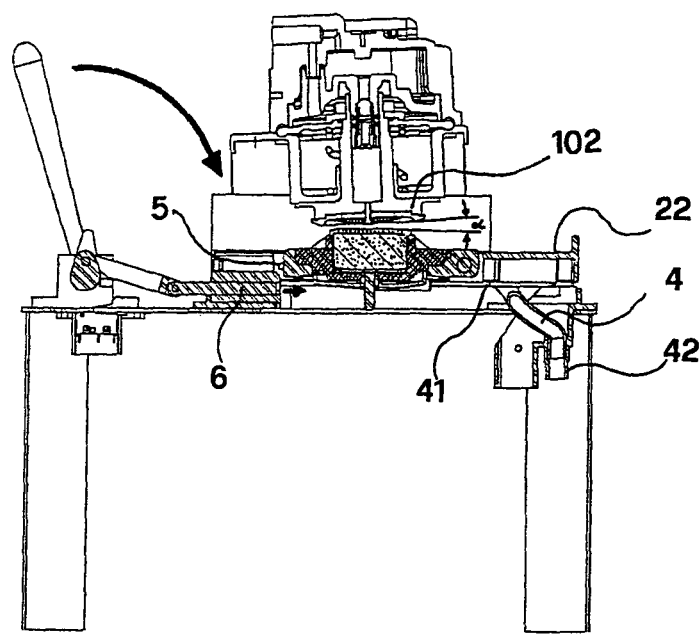
FIG. 7 shows a cross-sectional view of the infusion machine of FIG. 2 in the operation step.
Figure 8:
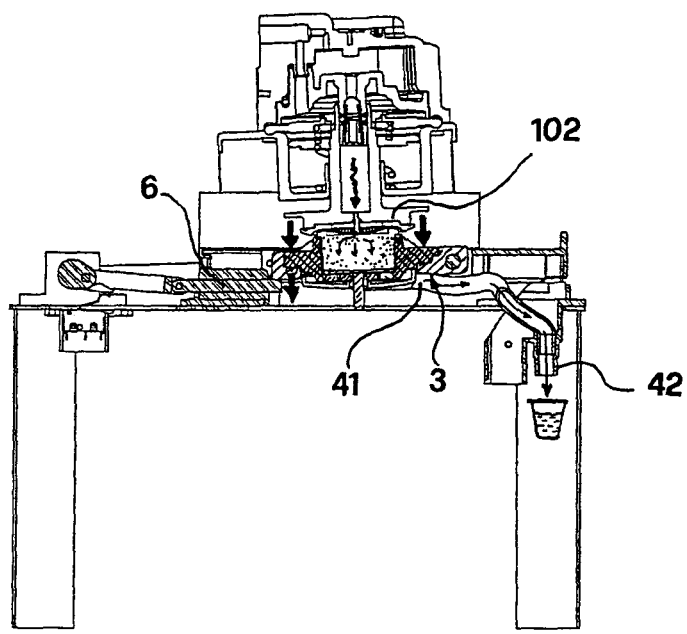
FIG. 8 shows a cross-sectional view of the infusion machine of the FIG. 2 in the infusion extracting step.
Figure 9:
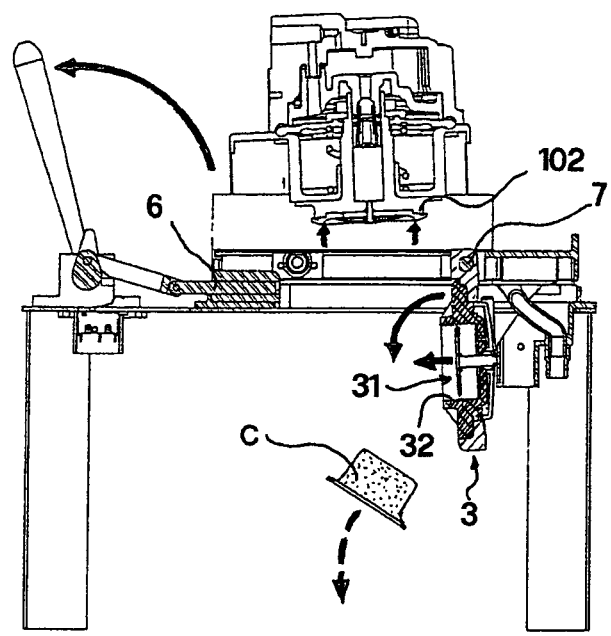
FIGS. 9 and 10 show respectively a cross-sectional view and a perspective view of the infusion machine of FIG. 2 in the cartridge C ejecting step.

In particular, as it is shown, e.g., also in the sequence of FIGS. 5 to 9, the housing 3 is rotatably connected, at a first transverse end thereof, to the support 2 so as to assume a first "active" operating configuration of loading the cartridge C (FIGS. 5 and 6) and extracting the infusion (FIGS. 7 and 8) and a second "passive" operating configuration of ejecting the cartridge C (FIG. 9). As it will be detailed hereinafter, in the operating configuration of loading the cartridge C and extracting the infusion, the means for locking (5) and supporting (6) the housing 3 are both apt to support a second free transverse end of the housing 3, opposite to the end rotatably connected to the support 2.

The rotatable connection between housing 3 and support 2 is made through suitable rotatable connection means 7, e.g. a pin and a related seat, which in a preferred embodiment may also envisage an opposing element 71, associated e.g. to the pin or the seat, its function being that of fostering the rotation of the same housing 3 in the change from the configuration of loading the cartridge C and extracting the infusion to the configuration of ejecting the cartridge C. The opposing element 71 may be, for instance, a torsion spring. Therefore, according to the preferred embodiment considered herein, rotation of the housing 3 with respect to the support 2 occurs about the axis of rotation defined just by the pin, and therefore about an axis lying on a substantially horizontal plane.

More specifically, as shown in FIG. 1, in the present embodiment the housing 3 comprises a first removable upper body 35 and a second portion 34, rotatably connected to the support 2 and forming a lower portion 33 of the housing, said lower portion 34 being permanently connected to the support 2 and apt to removably receive the first body 35.

First body 35 and second portion 34 are connected or connectable through removable connection means selected from a group comprising, e.g., bayonet means, slide means and snap means.

In the removable body 35 a seat 32 is obtained, shaped so as to receive the specific cartridge C. In particular, the seat 32 has a bottom surface 321 foraminated to allow transit of the infusion to the lower portion 33 of the housing 3. Said lower portion 33 in turn has an infusion outlet port 331 to which the tubular element 4 is connected or connectable. In a preferred embodiment the infusion outlet port 331 is positioned sideways in said lower portion 33.

In this embodiment the cartridges/pods C loading and ejecting device 1 comprises a plurality of interchangeable first bodies 35, each one having a seat 32 of suitable shape apt to receive a respective type of cartridge.

According to the present invention, to the housing 3 it is further associated means 31 for ejecting the cartridge C, apt just to cause the disengaging of the seat 32 by the latter when the housing 3 assumes said "passive" operating configuration shown in FIG. 9.

In a preferred embodiment the ejecting means 31 is substantially piston-shaped, and it comprises a thrust plate 311 and a rod 312. In particular, the thrust plate 311 has an upper surface, apt to receive in abutment the cartridge C, and a lower surface, facing a bottom surface 321 of the seat 32 and to which the rod 312 is fixed at a first end thereof. The thrust plate 311 is foraminated so as to allow infusion transit to the outlet port 331.

Figure 5:
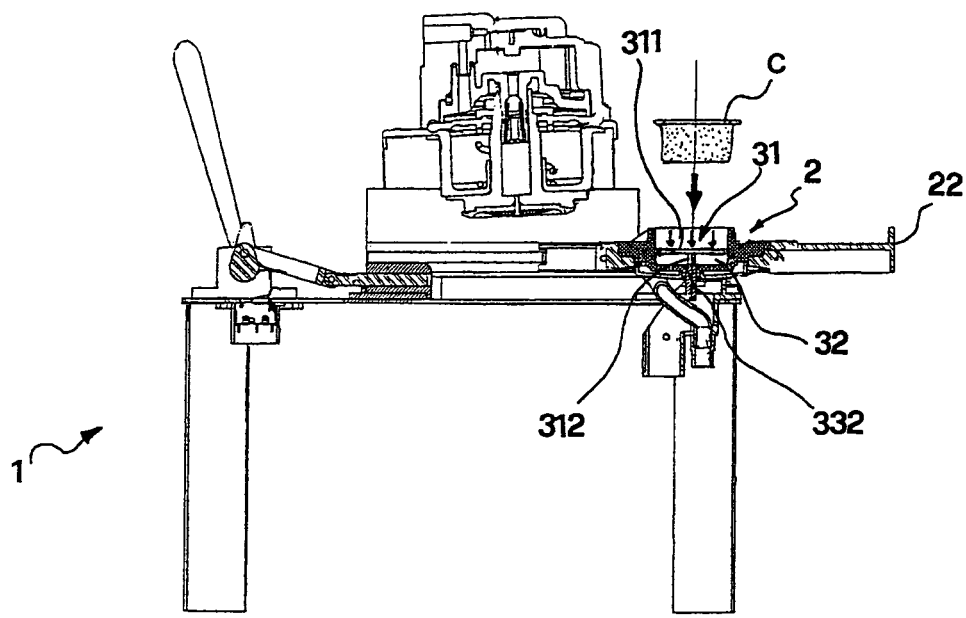
FIG. 5 shows a cross-sectional view of the infusion machine of the FIG. 2 in the cartridge (C) loading step.

As shown in FIG. 5, the thrust plate 311 and the rod 312 are slidably mounted respectively in the seat 32 and in foramina 332 obtained on the bottom surface 321 and on the lower portion 33 of the housing 3. In particular, the rod 312 has a second end (opposite to said first end) that may be arranged externally to the bottom portion 33 of the housing 3 when the ejecting means 31 is in a configuration close to the bottom surface 321.

In a preferred embodiment, rod 312 and foramina 332 may form a sliding fluid-tight coupling.

According to said sliding connection between ejecting means 31 and housing 3, the former can change from a resting configuration, in which it is close to the bottom surface 321 of the seat 32 and the latter is apt to receive the cartridge C, to a configuration at some distance from the bottom surface 321, in which said means is apt to eject the cartridge C.

In an embodiment alternative to the hereto-disclosed one, the housing 3 is piece-formed.

As shown in detail in FIGS. 7 and 8, the tubular element 4 for dispensing the infusion is a duct of substantially tubular shape, connected or connectable to the housing 3. In particular, the duct 4 has a first end 41 connected or connectable to said outlet port 331 and apt to receive infusion made from the cartridge C and a second end 42 apt to dispense the infusion. In the present embodiment the duct 4 is of elastic and/or flexible material, so as to "follow" the motions of the housing 3.

Always according to a preferred embodiment, the device 1 also comprises: an element 21 for actuating the ejecting means 31, integral to the frame of the support 2; the above-mentioned slide 22, sliding on the frame of the support 2, and at which it is made the rotatable connection between the housing 3 and the same support 2; slide guides 23, apt just to guide the slide 22 and said housing 3 with respect to the frame of the support 2 and formed on crossbars integral to the frame itself; and control means 26 for controlling the device 1.

According to the present embodiment, the element 21 for actuating the ejecting means 31 is a shaped abutment element for the rod 312. Of course, according to alternative embodiments the actuating element 21 may in turn be a rod or any other means apt to allow sliding of the ejecting means 31 when the housing 3 lies in the operating configuration of ejecting the cartridge C.

As is evident from the sequence of FIGS. 2, 3 and 6, 7, the slide 22 is movable, on the slide guides 23, between a loading position, in which the cartridge C can be positioned on the housing 3 (FIGS. 1, 2, 5 and 6), and an infusion extracting and cartridge C ejecting position (FIGS. 3, 4, 7, 8, 9 and 10).

As is shown in FIGS. 8 and 9, in the present embodiment the housing 3, when in the configuration of ejecting the cartridge C, is rotated of about 90°, and in particular substantially vertical, with respect to the operating configuration of extracting the infusion and loading the cartridge C, in which it is substantially parallel to the connecting slide 22 and therefore substantially horizontal.

As mentioned above, the means for locking 5 and supporting 6 the housing 3 are connected to the support 2 and apt to support a second free end of the housing 3 in the operating configuration of loading the cartridge C and extracting the infusion. In particular, the locking means 5, integral to the frame of the support 2, is snap-locking means, like e.g. snap pins, apt to engage with the housing 3. As it will be evident hereinafter, the snap-locking means 5 allow the housing 3 to disengage when it is subjected to a force greater than or equal to a predetermined threshold level. The supporting means 6 is instead sliding on a respective guide 27 of the support 2 and apt to assume:

an advanced configuration of supporting, when the housing 3 lies in the configuration of extracting the infusion, as shown in FIGS. 7 and 8; and a retracted configuration of disengaging, when the housing 3 lies in the passive configuration of expelling the cartridge C, as shown in FIG. 9.

In the advanced configuration, the supporting means 6 is apt to receive in abutment the free end of the housing 3 when the latter is disengaged from the locking means 5, whereas in the retracted configuration the supporting means 6 do not allow support of the housing 3, which therefore is free to rotate about the pin 7.

In the present embodiment, as shown e.g. in FIG. 1, the supporting means 6 is slidably connected to the support 2 at an end portion of the sliding means 23 opposite to that apt to receive the housing 3.

Evidently, alternative embodiments may provide a different implementation of the locking and supporting means 5 and 6 based on the use of electronic components for operation and disconnection, optionally automatic or automated (smart), of the same locking and supporting means.

In a preferred embodiment, the control means 26 for controlling the device 1 comprises a lever 261 and a connecting rod 262 for connecting the lever 261 with the supporting means 6.

The control means 26 may also comprise a switch 263 and a cam 264 for actuating the switch 263. The switch 263 has the task, during use of the device 1 with an infusion machine, of turning on and off said machine.

Evidently, alternative embodiments may provide a different implementation of the control means 26, based, e.g., on electronic components for the automatic or automated (smart) operation thereof.

Hereinafter, it will be briefly described an infusion machine 100 comprising a boiler unit 101 and a pod/cartridge loading and ejecting device 1 according to the present invention and the hereto-described embodiments.

In the following, for "boiler unit" it will be meant any element, member or device comprised and suitable for operation of an infusion machine, with the exception of the above-described pod/cartridge C loading and ejecting device.

Figure 6:
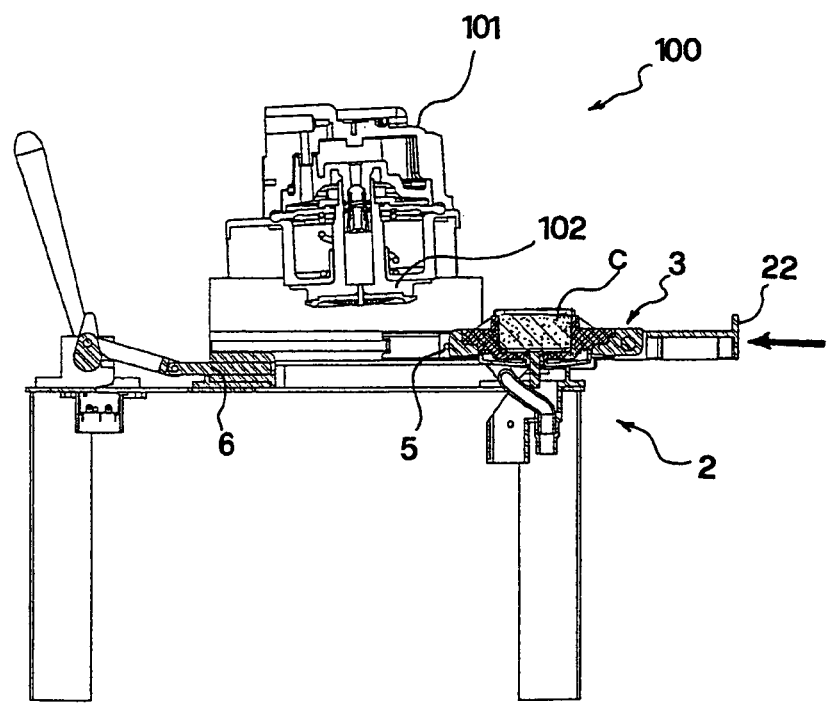
FIG. 6 shows a cross-sectional view of the infusion machine of FIG. 2 in the step of prearranging the pod (C) under the boiler.

In particular, as shown, e.g., in FIGS. 6, 7 and 8, the boiler 101 comprises means 102 apt to impart a predetermined pressure to the cartridge C contained in the housing 3 and to dispense a fluid for the extracting of the infusion from the cartridge C. As shown in FIG. 7, in the present embodiment the means 102 and the housing 3 are tilted therebetween of a predetermined angle α so as to foster the disengagement of the housing 3 from the locking means 5. In particular, preferably the angle α is greater than or equal to 3°.

Lastly, as mentioned above, the control means 26 for controlling the device 1 are also means 26 for controlling the infusion machine 100, and therefore such as to coordinate the steps of loading the cartridge C, extracting the infusion and ejecting the cartridge C.

Operation of the device 1 described hereto will be made apparent from the description of the related process of use in conjunction with said infusion machine. In particular, operation of the device 1 will presently be described by way of example with reference to a preferred embodiment wherein the housing 3 comprises said first interchangeable removable body 35 and the control means 26 is of a manual type. Referring again to FIG. 1, the first removable body 35 of the housing 3, selected according to the cartridge to be used, is connected to the second portion 34.

Figure 2:
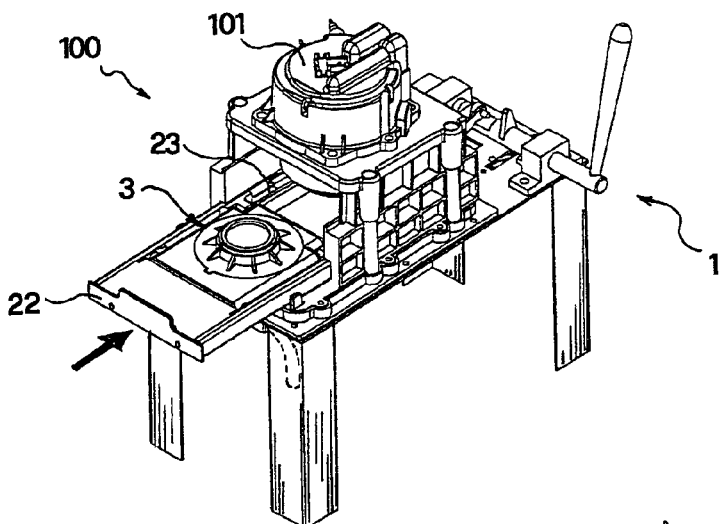

Then, the cartridge C is placed into the seat 32 as shown in FIG. 5. In this step the device 1 lies in the operating configuration of loading the cartridge C, in which the control means 26 is in the "off" position. In this position, the lever 261 is lifted so as to keep, through the connecting rod 262, the supporting means 6 in the retracted configuration. Moreover, in the present embodiment the housing 3, in spite of the effect of the torsion spring 71, is kept by the locking means 5 in a horizontal arrangement and therefore substantially parallel to the slide 22. As shown in FIG. 2, the set formed by connecting slide 22 and housing 3 is in a lateral position with respect to the boiler 101.

Referring to FIGS. 2 and 6, upon inserting the cartridge into the seat 32, slide 22 and housing 3 are brought under the boiler 101. In this step, connecting slide 22 and housing 3 are integral and move along the guides 23. Thanks to its elasticity and/or flexibility, the infusion extracting element 4 follows the housing 3, to which it is connected, during its motion.

Figure 3:
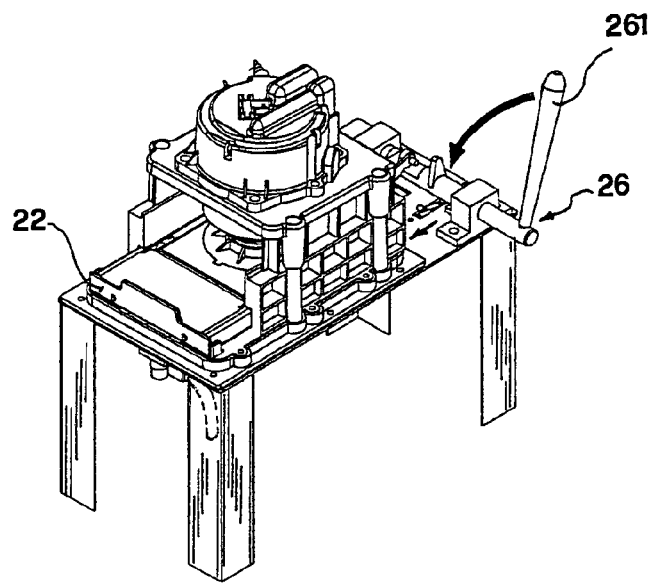

When the device 1 lies in said configuration in which the housing 3 is under the boiler 101, the control means 26 can be actuated. Then, as shown in FIGS. 3 and 7, it is rotated the lever 261, which, via the connecting rod 262, moves the supporting means 6. The latter, by sliding on the guide 27 of the support 2, change from the retracted configuration to the advanced configuration. The lever 26 upon completing its rotation actuates the switch 263, which starts the boiler 101.

Figure 4:
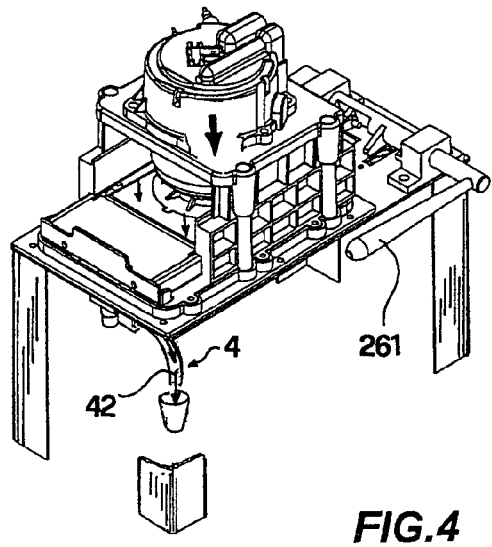

As shown in FIGS. 4 and 8, actuation (operation) of switch 263 lowers the pod-pressure means 102 that, once into contact with the housing 3, impart on the latter a (predetermined) force such as to disconnect the second free end of the housing 3 from the snap-locking means 5.

In a preferred embodiment, as mentioned above, the pod-pressure means 102 and the housing 3 are tilted of an angle α so as facilitate disengagement of the housing 3 from the snap-locking means 5.

As shown in FIG. 8, the housing 3, not connected anymore to the locking means 5, rotates about the pin 7 until abutting on the supporting means 6.

At this point, the housing 3 lies in the operating configuration of extracting the infusion. The pod-pressure means 102 starts dispensing the fluid held in the boiler 101, said fluid passes through the pod and infusion made reaches, for instance, a collection cup via the tubular element 4, as shown in FIG. 8.

The step of making and dispensing the infusion ends when the lever 261 is returned to the initial "off" position. During the initial step of rotating the lever 261 there occurs the switching off of the switch 263, causing the lifting of the pod-pressure means 102 and the stopping of the dispensing of fluid from the boiler 101.

A further rotation of the lever 261 moves the supporting means 6, which by sliding into the guide 27 of the support 2 changes from the advanced configuration to the retracted configuration, as shown in FIG. 9.

Then, the housing 3 is completely free to rotate about the pin 7, coming into the passive configuration of ejecting the cartridge C.

In a first embodiment of the device 1, the overall configuration of the support 2 and of the housing 3 is such as to allow the latter to change passively, by effect of the sole gravity, from the operating configuration of extracting the infusion to the passive configuration of ejecting the cartridge C.

In a second preferred embodiment of the device 1, the rotatable connection means 7 comprises said opposing element 71 fostering rotation of the housing 3 in the change from said operating configuration of extracting the infusion to said passive configuration of ejecting the cartridge C.

Rotation of the housing 3 continues until the ejecting means 31 impacts against the related actuating element 21. In particular, as shown in FIG. 9, the rod 312 of the ejecting means 31 impacts and abuts against the element 21. The impact causes the sliding of the bearing element 311 and the rod 312, respectively into the seat 32 and in the foramina 312, causing the changing of the ejecting means 31 from the configuration close to the bottom surface 321 to that at some distance therefrom, in which the cartridge C is ejected.

Figure 10:
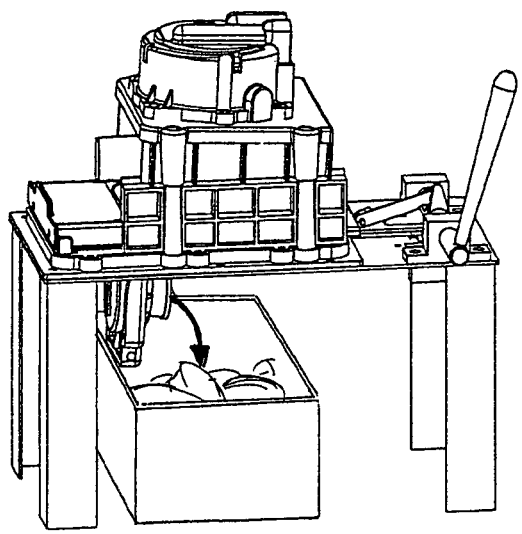

As shown in FIG. 10, the cartridge ejected from the housing 3 falls into a collection drawer.

As it will be evident from the annexed figures, the step of ejecting the cartridge C occurs by a mere rotation of the housing when it still lies under the boiler 101. Thus, the housing 3 is "emptied" of the cartridge C at the end of each infusion making cycle, so as to be ready for a subsequent use.

Lastly, to return the housing 3 into its operating configuration of loading the cartridge C it is effected a shifting of the connecting slide 22 and of the housing 3, until returning them to the initial position in which they were arranged sideways to the boiler 101. In doing that, the housing 3 meets a shaped upper portion of the actuating element 21 that, as a cam guide, forces it to rotate until connecting it with the locking means 5.

It will be understood that the present invention is susceptible of several embodiments and variants alternative to the hereto-described ones.

In particular, as mentioned above, the control means 6 may be manufactured with automatic means, like e.g. ratio-motors, electromagnets, etc. "controlled" by management electronics with no need of operator's intervention in the two steps of the operation.

The present invention has been hereto described with reference to preferred embodiments thereof. It is understood that other embodiments might exist, all falling within the concept of the same invention, and all comprised within the protective scope of the claims hereinafter.

The invention claimed is:

1. A machine (100) for dispensing infusions from a preparation in pods or cartridges, comprising:
   a boiler unit (101); and
   a loading and ejecting device (1) adapted for receiving pods or cartridges (C) containing a substantially granular substance for the preparation of an infusion such as coffee;
   said loading and ejecting device comprising:
   a support (2);
   a housing (3) apt to receive a cartridge (C) and connected or connectable to said support (2) so as to assume a first operating configuration of loading the cartridge (C) and extracting the infusion and a second operating configuration of ejecting the cartridge (C);
   an ejecting means (31) for expelling a cartridge (C), associated with said housing (3) and apt to cause the ejection of the cartridge (C) contained in said housing (3) when the housing assumes said second operating configuration; and
   an actuating element (21) associated with said support (2), for activating said ejecting means (31),
   the arrangement being such that when said housing (3) assumes said second operating configuration said actuating element (21) causes the ejection of the cartridge immediately after the extraction of the infusion therefrom;
   wherein said boiler unit (101) comprises pressure means (102) apt to impart a predetermined force onto the cartridge contained in the housing (3) and to dispense a fluid that passes through the cartridge (C) for making the infusion, and
   said pressure means (102), when imparting the predetermined force onto said cartridge, and said housing (3) are inclined with respect to each other by a predetermined angle (α).

2. The machine according to claim 1, wherein said housing (3) has a lateral infusion dispensing port (331).

3. The machine according to claim 1, wherein said ejecting means (31) comprises a thrust element (311) movable within said housing (3).

4. The machine according to claim 3, wherein said thrust element (311) is slidable within said housing (3).

5. The machine according to claim 4, wherein said thrust element (311) is slidably mounted in said housing (3) between a first configuration close to a bottom surface (321) of said housing (3), wherein said housing (3) is apt to receive the cartridge (C), and a second configuration at a distance from said bottom surface (321), wherein said thrust element (311) is apt to eject the cartridge (C).

6. The machine according to claim 3, wherein said thrust element (311) is shaped so as to allow infusion transit.

7. The machine according to claim 1, wherein said ejecting means (31) comprises a substantially piston-shaped element (311, 312).

8. The machine according to claim 1, wherein said ejecting means (31) is movable in a fluid-tight manner within said housing (3).

9. The machine according to claim 1, wherein said actuating element comprises a shaped abutment body (21) for said ejecting means (31).

10. The machine according to claim 1, comprising a duct element (4) for dispensing the infusion to a collection means, such as a cup, of elastic or flexible type.

11. The machine according to claim 1, wherein said support (2) comprises a movable portion (22) adapted for receiving said housing (3) and that is movable between a position of loading the cartridge (C) and a position of extracting the infusion from the cartridge (C) and subsequent ejecting the cartridge (C).

12. The machine according to claim 1, wherein said predetermined angle (α) is greater than or equal to about 3 degrees.

* * * * *